(12) United States Patent
Swenson et al.

(10) Patent No.: US 7,231,269 B2
(45) Date of Patent: Jun. 12, 2007

(54) RECOVERY UPON ACCESS VIOLATION BY AUDIO PROCESSING OBJECT

(75) Inventors: Steven E. Swenson, Redmond, WA (US); David W. Flenniken, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 10/393,661

(22) Filed: Mar. 20, 2003

(65) Prior Publication Data

US 2004/0186601 A1     Sep. 23, 2004

(51) Int. Cl.
*G06F 17/00* (2006.01)
*G06F 11/00* (2006.01)
*G06F 3/00* (2006.01)

(52) U.S. Cl. ............... 700/94; 714/15; 714/20; 719/322

(58) Field of Classification Search ............ 700/94; 719/322, 323; 714/15, 20; 704/200; 84/626
See application file for complete search history.

(56) References Cited

U.S. PATENT DOCUMENTS

| | | | | |
|---|---|---|---|---|
| 5,971,851 A | * | 10/1999 | Pascal et al. | 463/24 |
| 6,175,916 B1 | * | 1/2001 | Ginsberg et al. | 712/228 |
| 6,216,173 B1 | * | 4/2001 | Jones et al. | 715/705 |
| 6,243,753 B1 | * | 6/2001 | Machin et al. | 709/227 |
| 6,832,380 B1 | * | 12/2004 | Lau et al. | 719/328 |

FOREIGN PATENT DOCUMENTS

| | | |
|---|---|---|
| EP | 0701209 | 3/1996 |
| EP | 701209 A2 * | 3/1996 |
| EP | 0965923 | 12/1999 |
| EP | 965923 A2 * | 12/1999 |

OTHER PUBLICATIONS

Bohannon, Philip. et al. Using Codewords to Protect Database Data from a Class of Software errors. Data Engineering 1999. Proceedings 15th International in Sydney, Australia, Mar. 23-26 1999, pp. 276-285.*

Bohannon et al., "Using codewords to protect database from a class of software errors," DATA Engineering 1999. Proceedings 15th International Conference on Sydney, Australia, Mar. 23-26 1999, pp. 276-285.

* cited by examiner

*Primary Examiner*—Vivian Chin
*Assistant Examiner*—Devona E. Faulk
(74) *Attorney, Agent, or Firm*—Lee & Hayes, PLLC (57) ABSTRACT

An operating system is logically separated into a partition for a kernel and a partition for an audio subsystem having logically separate subpartitions. An audio application generates a first audio datastream by executing the audio subsystem. The context of a process for processing the first audio datastream is preserved in a first subpartition. The processing of the first audio datastream with the process takes place in a second subpartition. When the process commits an access violation, the process is recovered by restoring in the audio subsystem the preserved context from the first subpartition.

46 Claims, 5 Drawing Sheets

RECOVERY UPON ACCESS VIOLATION BY AUDIO PROCESSING OBJECT

TECHNICAL FIELD

This invention generally relates to streaming audio processing and, more particularly, to recovery from an access violation by an audio processing object during streaming audio processing.

BACKGROUND

Computing systems, such as the personal computer (PC), are increasingly being used for the recording and playing back of streaming audio data. The PC can be used as a type of media server where several audio, video and multimedia applications are simultaneously running, each of which uses the operating system (OS) of the PC. By way of example of a PC as a media server, consider the following simultaneous uses scenario. A Digital Video Disk is being played back by a first media player application (MP) that uses a DVD player on the PC. A microphone is being used for a Voice-Over-Internet Protocol in a Real Time Communication Application (RTC) for network telephony in which users of respective computing systems talk to one another over a packet switched network, much as a telephone user talks to another telephone user over a circuit switched network. System sounds are being generated by the OS during user interaction with the PC. A Video-On-Demand application (VOD) is being executed by the PC as streaming multimedia is being received via a cable or satellite TV broadcast system. A music disk (e.g., CD) is being played back by the execution of a second media player application that uses a CD-ROM drive of the PC. Another user is playing a video game on the PC, where a corresponding game application is generating an audio data stream based upon the user's interaction with the game application. One or more global audio effect applications (GFX) can also be executing on the PC. Examples of GFX include a reverberation effect application, an audio distortion effect application, a speaker compensation application performed by Digital Signal Processing (DSP) of streaming audio data to be rendered at one or more speakers, a multiband audio equalizer application is executing so as to present a user interface (UI) that works with an audio device (e.g., a sound card) to enable the PC user to adjust audio output from the audio device for various presets (e.g., concert hall, rock, classical, etc.), and other GFX that do DSP on one or more audio data streams that are output to one or more audio devices driven by one or more audio drivers.

Any application listed in the above example, as well as other audio visual applications, can be poorly written such that its execution fails and the application aborts. Such a failure of the application can cause a serious failure of the OS of the PC, also known as a computer crash, where the PC itself stops working. A computer crash can signify a very serious software bug in the code in which the application is written. In the instance of an audio application that requests the OS to output to an audio device, the bug can result in an access violation. The memory for a kernel (e.g., scheduling service) of the OS and the memory used to process the audio in the OS are supposed to be completely isolated from each other. An access violation occurs when the audio application performs an access to memory that is not resident (e.g., the memory access is not a legal or is impermissible). Access violations typically occur when an audio application has an audio device driver that is running in kernel mode. If the audio application makes an access violation to the kernel space of the OS or to the audio device driver, the access violation can cause a computer crash.

As long as the kernel of the OS remains intact, an audio application that crashes will not cause the kernel to be unstable. Rather, only the audio application stops working and must be restarted. An access violation of the kernel, however, can cause the kernel to become unstable such that there will be a fatal error from which no recovery is possible. In a Microsoft Windows® operating system environment, a user of a PC is notified of a computer crash by a diagnostic that is displayed on a blue screen. Thus, the term Blue Screen of Death (BSOD) is conventionally used. When the user gets the BSOD, there is no other recovery than to restart or boot the PC.

A particular detriment to using a PC as a media server occurs when just one of the several executing audio and audio visual applications has a software bug. The software bug can cause different levels of disruption in the audio being rendered from the PC. In the least disruption, only the audio datastreams generated by the bug-laden application are affected. At a higher level of disruption, all audio devices are affected and perhaps cease working, which is a cessation of the global rendering of audio to all audio devices. In an even more severe scenario, the software bug in one of the audio applications causes a computer crash, thus requiring all activity on the PC to cease until the OS is reloaded—which can take several minutes.

Given the foregoing, it would be an advantage in the art to provide an OS that services the audio requests of any kind of audio application executing on a computing system while isolating the audio application such that its failure during execution causes neither global audio rendering to cease nor a computer crash.

SUMMARY

In one implementation, a system audio service of an operating system preserves the context of an audio application, where even though the processing of the audio application fails, the processing can be recovered. In another implementation, a computing system has a processor for executing an audio application to generate a first audio datastream. The processor executes an operating system that is logically separated into a partition for a kernel and a partition for an audio subsystem. The audio subsystem is separated into logically separate subpartitions. A process (e.g., an audio processing object) for processing the first audio datastream with the audio subsystem has a context that is preserved in a first subpartition prior to executing the process in a second subpartition. When the process commits an access violation, the process is recovered by restoring the context thereof from the first subpartition. The preserved context for the process includes address and data structure information sufficient to recover the process by the restoration of the preserved context in the audio subsystem. When the processor executes an audio application to generate a second audio datastream to be output to a second audio device different than a first audio device at which the first audio data steam is to output, neither the access violation nor the recovery of the process will effect audio that is to be output by the second audio device.

BRIEF DESCRIPTION OF THE DRAWINGS

A detailed description is given with reference to the accompanying figures in which the same numbers are used throughout the disclosure and figures to reference like components and features. Series 100 numbers refer to features originally found in FIG. 1, series 200 numbers refer to features originally found in FIG. 2, and series 300 numbers refer to features originally found in FIG. 3, and so on.

DETAILED DESCRIPTION

Multiple audio devices and application drivers for driving the same can be in communication with a computing system that is being used as a media server. As such, the computing system can be simultaneously sending audio to more than one of the audio devices. An Operating System (OS) of the computing system has both a kernel and a built-in audio subsystem that is just one subsystem of many subsystems of the operating system. One or more of the applications make a request to the audio subsystem to execute an Audio Processing Object (APO) that will have a global effect (GFX) on all audio that is being directed to one of the audio devices. By way of example, the GFX APO can be a reverberation effect, a distortion effect, a speaker compensation effect, or another Digital Signal Processing (DSP) effect.

The audio subsystem isolates the kernel of the OS from the audio device drivers and from each other. This isolation, which is a sandboxing technique, allows for recovery when an audio application fails, such as by committing an access violation. The isolation ensures that only the audio from a failing application will cease, rather than all of the audio from all applications that are executing. The isolation also ensures that the access violation will not cause the computing system to crash, this avoiding a boot (e.g., bootstrap) operation. The failing application can be restarted and continue to produce audio. A user experiences only a momentary loss of audio from the failure of the application. The audio loss perceived by the user of the computing system is limited to the audio of the failing application and will be varied as to the period of missing sound.

In one implementation, two users can be using a Personal Computer (PC) as a media server, where a first user is playing a movie on a DVD on the PC's DVD player and the sound from the movie is processed by a first sound card for rendering at a first set of speakers. A second user is playing a song on a compact disk (CD) using a CD reader of the PC. As to the second user, the playback is to be rendered to a second set of speakers that are in communication with a second sound card that is in communication with a motherboard of the PC. The second sound card is driven by an audio device driver. The playback of the song is performed by execution of a media player application on the PC. The media player application calls for a GFX APO on an audio data stream that is produced by the playback of the song. If the GFX APO has a software bug that causes it to fail during execution, such as by committing an access violation, the second user will experience, for example, a five (5) second loss of sound during a recovery from the failure. During the recovery, the computer will not need to be restarted and the first user will not experience any loss of sound in the playback of the movie on the DVD. The GFX APO is reloaded and the audio subsystem brings the audio back where it left off for the playback of the song. The reloaded GFX APO continues to execute so as to process an audio datastream to be rendered to the second set of speakers with the second sound card. If any other audio device was rendering audio using the PC, neither would that audio be lost by the access violation or by the recovery.

Figure 1:
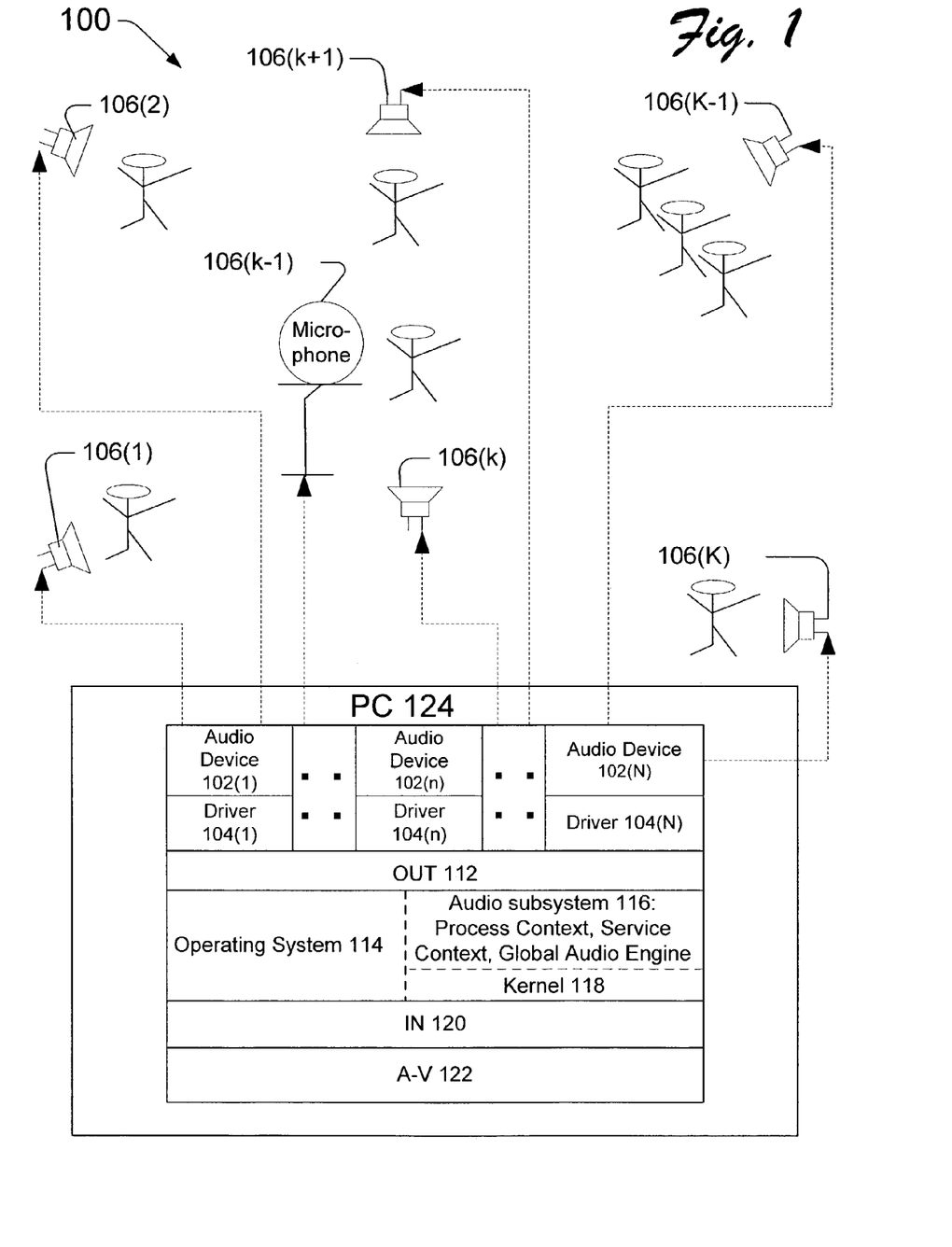
FIG. 1 shows an exemplary computing system in an environment in which the computing system is being used as a media server to service audio to a plurality of users in a plurality of locations.

FIG. 1 shows an environment 100 in which a PC 124 is being used as a media server. A number of persons are seen in FIG. 1, each of which is listening to audio rendered from one or more speakers 106. PC 124 has portable media readers, such as a Digital Video Disc (DVD) reader and a Compact Disk (CD) reader, in an A–V section 122 to playback multimedia including audio for the benefit of the persons that are using PC 124 as a media server. PC 124 is executing a plurality of multimedia applications to playback portable media that is being read from the portable media readers in the A–V section 122. Audio data is being communicated to an input section 120 that is in communication with an operating system (O/S) 114. One such multimedia application may be the Windows® Media Player software as provided by the Microsoft Corporation, of Redmond, Wash., USA.

The O/S 114 of PC 124 has an output section 112 that communicates with various audio devices 102(1–N) through their corresponding drivers 104(1–N). By way of example, the audio device 102 can be a two channel sound card, a pair of Universal Serial Bus (USB) speakers, a network speaker (TCP/IP speaker), or another device that can accommodate the output of one or more channels of sound, etc. For instance, one audio device 102 can be a sound card that is an expansion board mounted on a mother board of PC 124 that enables PC 124 to render sound to one of the speakers 106 by translating digital data into analog sounds. Audio device 102 can be used to render (playback) or capture (record) audio data. For instance, audio device 102 can be used to record sound input from a microphone 106(k–1) connected to the PC 124, and can be used to manipulate sound stored on a disk. One person is depicted as speaking into microphone 106(k–1)) while listening to one or more speakers 106(k). Audio is rendered and captured through operation of the O/S 114. Microphone 106(k–1) can be used with speaker 106(k) in a network telephony environment in which a person talks into microphone 106(k–1) so as to speak to a user of another PC via a network, were each PC is executing a real time communication application (RTC).

The O/S 114 includes logically separate partitions, which are an audio subsystem 116 and a kernel 118. The kernel 118 is a scheduling service for the operating system 114. The audio component 116 can include various software components as discussed below with respect to FIG. 2.

Figure 2:
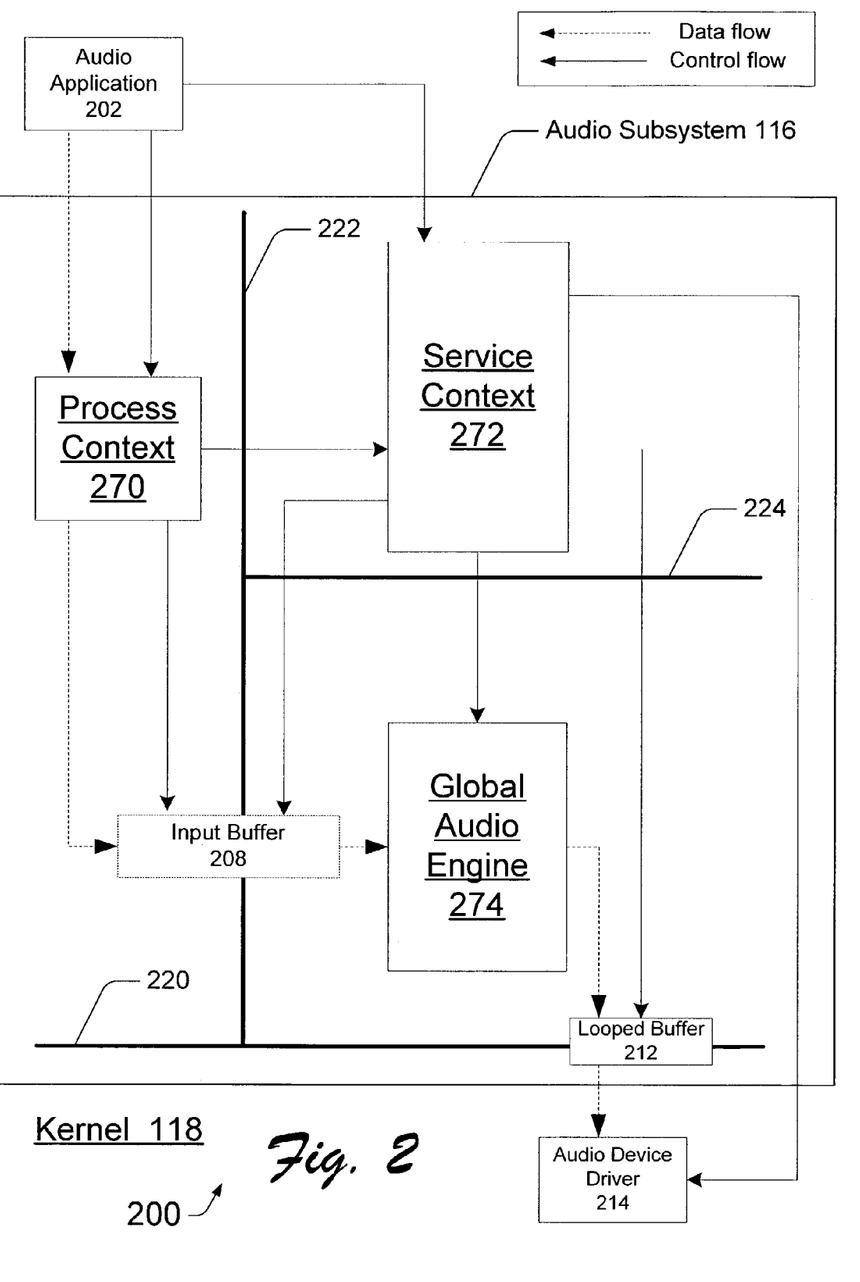
FIG. 2 shows an implementation in which an audio application is executing in a computing system having an operating system in communication with a driver for an audio device.

An implementation of the O/S 114 of FIG. 1 is seen in FIG. 2, where an environment 200 enables sound to be rendered by an audio device that is driven by an audio device driver 214. The wide, dark lines in FIG. 2 are intended to indicate that O/S 114 has two (2) logically separate partitions defined by line 220 and that the audio subsystem 116 has three (3) logically separate subpartitions defined by dark lines 220–224. The two logically separate partition of O/S 114 are the kernel 118 and the audio subsystem 116 that are separated by line 220. Each partition has its own address space in user mode and it is completely isolated from each of the other and from any other application that is running. Similarly, each subpartition has its own address space in user mode and it is completely isolated from each other partition and from any other application that is running. All three (3) subpartitions sit on top of the kernel 118 in user mode so that if any one subpartition crashes, the PC 124 continues to run without a fatal error. By the term 'context', as used herein, it is intended to mean the address space in a memory that is associated with a process and the data structures that are associated with that process, where the data structures are needed by the operating system for the process to be properly executed.

The environment 200 has solid lines with arrows that reflect the flow of instructions that control the audio subsystem 116. Dashed lines with arrows in environment 200 indicate the flow of audio data streams. The three (3) logically separate subpartitions in audio subsystem 116 are a process context 270, a service context 272, and a global audio engine 274. The global audio engine 274 can be synchronized with the audio device hardware driven by the audio device driver 214. When synchronized, the global audio engine 274 pumps data into a looped buffer 212 at the right times. The synchronized pumping enables the audio device driven by audio device driver 214 to read an audio datastream out of the looped buffer 212 at the right times.

An audio application 202 runs in the process context 270. The process context 270 has a separate address space for each audio application 202 that is running in the audio subsystem 116. As such, the running of each audio application 202 will not effect another audio application (not shown). The process context 270 performs processing of an audio data stream for the audio application 202. Errors in the software of the audio application 202 can be frequent due to the amount, speed, and frequency of audio data processing that is done during each wake up period by the audio application 202.

The process context 270, defined by lines 220–222, is serviced or managed by the service context 272. The process context 270 is representative of a client (or application) space which runs in a typical application process context. The audio application 202 generates an audio datastream that can be processed by a local effect engine (LFX) in the process context 270, which is then output to an input buffer 208. The input buffer 208 is at an interfacing of the process context 270 and the global audio engine 274. Stated otherwise, input buffer 208 stores the output from a local application operating in the process context 270. Although FIG. 2 depicts only one audio application 202 for the process context 270, it is contemplated that the audio subsystem 116 could support a plurality of audio applications for the process context 270 of the subsystem 116.

The service context 272 is defined by lines 222–224 in audio subsystem 116. The service context 272 is a component of the audio subsystem 116 that is present when the O/S 114 loads upon a boot of the PC 124 or when a user logs on or off. The service context 272 contains the application program interfaces (API) that any audio application requires in order to get access to the services of the audio subsystem 116. The service context 272 is representative of a global audio services space, such as policy and system graph services which is run in a system audio service. The service context 272 remains after a crash of processing by the process context 270.

The global audio engine 274 is a proxy for an audio device (not shown—e.g., a sound card) that is driven by the audio device driver 214 to which the global audio engine 274 is in communication through the looped buffer 212. The global audio engine 274 represents one process for each global audio engine processing space, where each global audio engine processing space is responsible for processing all audio data for any one particular audio device. Additionally, the global audio engine 274 of the audio subsystem 116 can virtualize a single audio device by mixing multiple connections to respective audio or multimedia applications, each of which produces an audio data stream. When so virtualized, the global audio engine 274 can present the mixed audio data streams as one audio data stream to the single audio device. As such, a multitude of simultaneously executing applications can all be outputting to the same audio device that they all share. Additionally, the global audio engine 274 can enable multiple audio devices to function at the same time while the PC 124 is being used as a media server.

An audio data stream in the input buffer 208 can be used as input to the global audio engine 274. The global audio engine 274 performs an Audio Processing Object (APO) to have a global effect (GFX) on an audio datastream to be output at the audio device driven by audio device driver 214. As such, the global audio engine 274 can mix and/or process the audio datastream in the input buffer 208, where the input buffer 208 is being used to store audio datastreams from a plurality of audio applications. The result of the mixing and/or processing of the audio datastreams in the input buffer 208 is an output of a single mixed audio datastream to the looped buffer 212. The looped buffer 212 interfaces with the global audio engine 274 for input to the audio device driver 214. As such, the looped buffer 212 can be used to store output from the global audio engine 274 and can be used as an input to the audio device driver 214.

The audio subsystem 116 of environment 200 provides one process for each global audio engine 274. Each global audio engine 274 is in turn responsible for the processing of all audio data streams for a respective audio device via an interface with a corresponding audio device driver. Although FIG. 2 depicts only one audio device driver 214 for one audio device, it is contemplated that the audio subsystem 116 could support a plurality of audio devices and their respective audio device drivers.

With reference to the foregoing, the audio application 202, the GFX APO executed by the global audio engine 274, and the audio device driver 214 each represent software that can be provided by a third party for use by the audio subsystem 116 of environment 200 to render an audio data stream at an audio device. As such, the environment 200 provides a place and a market for third parties to innovate and provide audio software to a customer who utilizes PC 124 upon which the audio subsystem 116 of the environment 200 resides.

The environment 200 shown in FIG. 2 isolates components of O/S 114 from the problems that result from access violations caused by the execution of faulty third party software. This isolation, otherwise known as sandboxing, is accomplished by preserving the context in which an audio data stream is being processed in the subpartitions 270 and 274 of audio subsystem 116. In one implementation, only the context of the global audio engine 274 is preserved by the service context 272. If the global audio engine 274 crashes, such as may occur due to an access violation, the crash will not affect either the process context 270 or the audio application 202. If the audio application 202 crashes, nothing in the audio subsystem 116 will be affected. If the service context 272 crashes, the entire audio subsystem 116 will crash.

Recovery of the Global Audio Engine

When there is a failure in the processing of a GFX APO in the global audio engine 274, such as by an access violation, the context of this processing that was preserved in the service context 272 can be used to recover the processing. After the recovery, the processing of an audio data stream can resume in accordance with the preserved context of the process as it has been preserved in the service context 272. The servicing of audio requirements performed by audio subsystem 116 is sandboxed from the kernel 276. This sandboxing prevents system wide failures. Applications that do crash or fail, including by local and global processing applications failures, can be automatically recovered so that processing can resume.

The preservation of the context of the processing, both local and global, can be accomplished by putting the mechanism of the processing in its own an address space. Stated otherwise, the context of the local audio engine's processing routine, which occurs in the process context 270, is saved in a separate address than the address at which is saved the context of the processing routines of the global audio engine 274. The address space of the process is separate from an address at which the context of the process is preserved. When the mechanism of the processing is put in its own address space, which is separate from the address of the mechanism of the context, the mechanism of the processing can crash while the mechanism of the context remains intact. The kernel 118, which is logically separated from the audio subsystem 116, also remains intact. As such, the crash will be limited to a termination of just the local processing for one (1) audio application or just the global processing for one (1) audio device. The crash will not cause the PC 124 to fail, thus avoiding a system restart or reboot that would otherwise be required in order to resume the rending of audio. After the crash, the mechanism of processing can then be restarted, rather that restarting the O/S 114 of PC 124, in order to resume the rendering of audio. Some implementations contemplate that the context is to be preserved so that the failed processing can be started back up.

An example of a recovery from the failure in the global audio processing of an audio data stream is now given by way of an example of an implementation in which a media player application is playing back audio data. The audio data is being subjected to a global audio effect (GFX) using a third party software Audio Processing Object (APO) that has a bug in it. The GFX APO software is a digital signal processing application that is processing an audio data stream in the global audio engine 274. The environment 200 coordinates the preservation (e.g., storage) in the service context 272 of the context of the processing that is occurring in the global audio engine 274. As such, the address space and data structures for the GFX APO in the global audio engine 274 are stored in service context 272. Eventually, the bug in the GFX APO executing in the global audio engine 274 performs an access violation. The access violation in turn causes the processing in the global audio engine 274 to crash. The consequence of the crash is that the audio that was being rendered on an audio device via the audio device driver 214 stops for a period of time. During this period of time, the environment 200 coordinates the recovery from the crash.

The recovery is accomplished by restoring the context of the processing of the GFX APO in the global audio engine 274. The context is recovered from the service context 272 where the context was preserved. Accordingly, the preserved context that is restored is the context of the input buffer 208, the context of the GFX APO processing in the global audio engine 274, and the context of the looped buffer 212. Once there has been a restoration of each context from the service context 272, the GFX APO processing in the global audio engine 274 can continue. After the context restoration, the audio can continue to be rendered on the audio device via the audio device driver 214. A customer using the computing system will hear a short loss in the audio (e.g., 5 seconds) while the GFX APO is reloaded by restoration of its preserved context in the global audio engine 274. The audio then returns and resumes approximately where it had left off. None of the other audio devices would lose audio by the crash of the GFX APO because the audio of each audio device is isolated by the environment 200 from that of other audio devices.

During the recovery from the crash, the processing of audio data by the global audio engine 274 will cause all audio streaming to or from the audio device being serviced by the audio device driver 214 to stop. Each audio application 202, however, will be unaware that the crash has occurred. Because the service context 272, which is responsible for maintaining the structure of the audio graph of the audio device, runs in a separate service context, the service context 272 can be used to restore the context of the global audio engine 274 after the crash due to its prior preservation. The service context 272 also has control over the state of the audio device driver 214 (i.e., whether started or stopped) and the shared buffers (e.g., the input buffer 208, the looped buffer 212) that are used between the subpartitions that identify the different process contexts. The service context 272 will reconnect the input buffer 208, the looped buffer 212, and the global audio engine 274 in their respective subpartitions. The audio application 202 will continue on, transparent to the crash (e.g., as if the crash or access violation had not happened).

In one implementation, the service context 272 can keep track of the number of times that any third party GFX APO software has crashed. After the number of times exceeds a predetermined threshold, a diagnostic or other dialogue to a user can be output on a User Interface (UI). The GFX APO can also be disabled or it can be re-enabled after a warning has been output on the UI to the user. Other "tiered" approaches to numerous access violations and subsequent recovery can be taken, such as where a diagnostic is output on the UI and the execution of the third party GFX APO software will not be restarted in the global audio engine 274. A tiered approach to a restoration after an access violation can be beneficial in avoiding excessive repetition in the bringing up and taking down of a faulty global effects component.

With respect to the audio application 202, a crash in the processing of audio data by the global audio engine 274 is transparent to the operation and execution of the audio application 202. Rather, the audio application 202 would continue inputting into the process context 270 for output to the input buffer 208 at the partition boundary between the process context 270 and the global audio engine 274. The service context 272 can then be used to restore the context and perform an automatic recovery of the global audio engine 274 while the audio application 202 remains unaware of the GFX APO crash.

Because the buffers 208, 212 still exist after the processing in the global audio engine 274 crashes, the state of the audio device driver 214 and the looped buffer 212 can be restored. When the service context 272 sets up the processing in the global audio engine 274 after the processing crashes, the service context 272 must know the address of the buffers 208, 212 so that the new global audio engine 274 can connect to these buffers and continue to receive audio data from the audio application 202 which is otherwise aware of neither the crash of the global audio engine 274 nor the address of the buffers 208, 212. Rather, the service context 272 maintains the buffers 208, 212 as objects so that they can be setup in the global audio engine 274 when the service context 272 recovers the global audio engine 274. The service context 272 passes instructions to the recovered global audio engine 274 that indicate that the buffers 208, 212 are to be used as inputs from the audio application 202 for a particular audio device. When the global audio engine 274 crashes, the restored global audio engine 274 gets the address of the looped buffer 212 from the service context 272. After an access violation, the audio device driver 214 may still be running and the looped buffer 212 can still be present.

The foregoing provides examples of an automatic recovery from a crashed GFX APO in the global audio engine 274 due to the preservation of context in the service context 272. The preservation of context in the service context 272 ensures that the audio to only one audio device is only disrupted for a short time as compared to the time required to re-boot the PC 124. Software developers can provide GFX APO to run on the audio subsystem 116 disclosed herein, which GFX APO can still crash without bringing down all audio devices or crashing the entire OS 114. The GFX APO can still be brought back up as long as the context has been preserved in the service context 272. The audio subsystem 116 provides the global audio engine 274 corresponding to each audio device (e.g., sound card, USB speaker, etc.) such that the global audio engine 274 can be run in its own context and be preserved in the service context 272. As such, the audio subsystem 116 is fault tolerant, robust against crashes/hangs, and can recover from crashes in the processing of audio data in GFX APO by the global audio engine 274.

Each audio device can be partitioned into a separate process context, in accordance with the architecture seen in environment 200. As such, crash-prone software that is running as a global audio effect by processing in the global audio effect 274 for one particular audio device will not affect the processing of audio data in a global audio engine for another audio device. Moreover, an automatic recovery can be accomplished when the processing in the global audio engine 274 crashes due to a bug in the global effects code that is being processed. The recovery is possible because the global state of the audio device is kept in the services context 272. As such, the crashed GFX APO can be brought back up and reconnected to the input buffer 208.

In general, a recovery from a crash in the processing in the global audio engine 274 will take down audio to a corresponding audio device from every application that produces an audio data stream for that audio device. In order to be as resistant to crashing as possible, the global audio engine 274 for each audio device can be run in its own context, where that context is preserved in the logically separate service context 272 of the audio subsystem 116.

Figure 3:
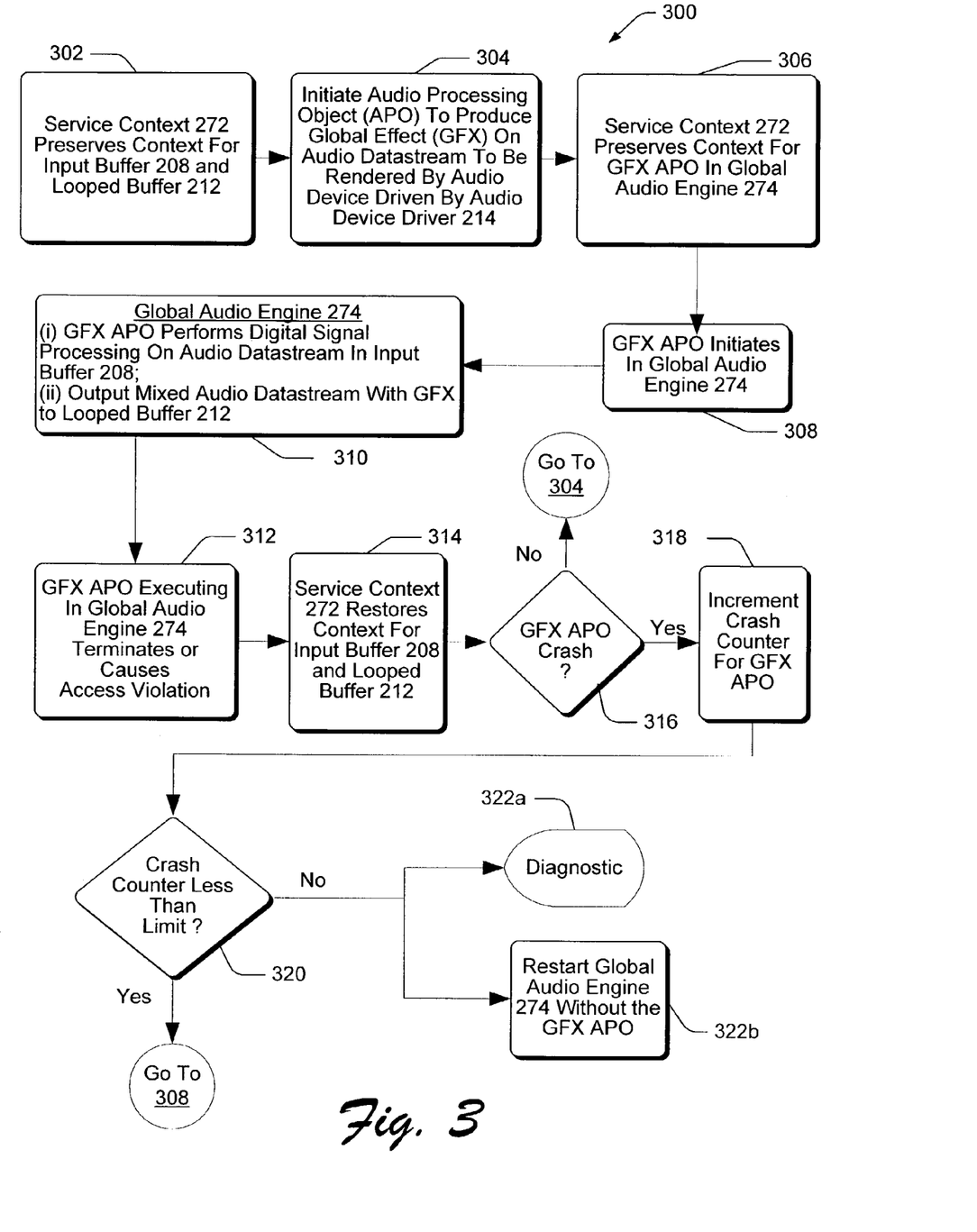
FIG. 3 shows a flow chart illustrative of a process in which an audio subsystem of an operating system services a request for executing an audio processing object (APO) to produce a global effect (GFX) on an audio datastream to be rendered by an audio device driven by an audio driver, where various context of the audio subsystem are restored after an access violation by the GFX APO using previously preserved contexts.

FIG. 3 shows a process 300 for recovering from an access violation by a GFX APO executing in a global audio engine. In reference to FIGS. 2–3, process 300 begins at block 302 where the service context 272 preserves the context (e.g., address and data structures) for the input buffer 208 and the looped buffer 212. At block 304, the APO for producing the GFX on an audio datastream is initiated. An audio datastream is to be rendered by an audio device driven by the audio device driver 214. Process 300 moves to block 306 where the service context 272 preserves the context for the GFX APO in the global audio engine 274. After block 306, process 300 moves to block 308 where the GFX APO is initiated. The execution in the global audio engine 274 continues at block 310 where the global audio engine 274 executes the GFX APO to perform digital signal processing on the audio datastream in input buffer 208. The output of this processing, which can include mixed audio datastreams from other local processes, is moved to the looped buffer 212. The mixed audio datastream in the looped buffer 212 has a global effect according to the processing by the global audio engine 274.

At block 312, the GFX APO terminates or causes an access violation. At block 314, the service context 272 detects the termination or access violation and restores the context of the input buffer 208 and the looped buffer 212. At block 316, a query is made as to whether an access violation had occurred. If not, process 300 moves to block 304. Otherwise, process 300 moves to block 318 where a crash counter for the GFX APO is incremented. The crash counter is queried at block 320 as to whether it exceeds a predetermined threshold. If so, a diagnostic 322a is displayed and process 300 moves to a block 322b at which the global audio engine 274 is restarted without the crash-prone GFX APO. If the crash counter for the GFX APO does not exceed the predetermined threshold, process 300 moves back to block 304.

Recovery of the Process Context

A recovery can be made from a failure in the local processing of an audio data stream. For instance, a media player application, seen in FIG. 2 as audio application 202, passes an audio data stream for processing by a Local Effects Audio Processing Object (LFX APO) in the process context 270. The LFX APO has a faulty portion of programming code that, when executed, causes an access violation (e.g., a bug is in the code). Prior to running the LFX APO in the process context 270, the audio subsystem 116 of environment 200 coordinates the preservation (e.g., storage) in the service context 272 of the context of the processing that is occurring in the process context 270. Eventually, the bug in the LFX APO causes the software to perform an access violation. The access violation in turn causes the processing in the process context 270 to crash. The consequence of the crash is that the audio that was being rendered to input buffer 208 stops for a period of time. As such, there will be a gap in the audio that is to be rendered to an audio device via the audio device driver 214. During this period of time, the environment 200 coordinates the recovery from the crash.

The recovery from the crash of the LFX APO in process context 270 is accomplished by restoring the context of the processing in the process context 270. Once the context has been restored from the service context 272, the execution of the audio application 202 can be restarted so that the LFX APO processing in the process context 270 can continue. Once the local processing has continued, an audio data stream can be output to input buffer 208 and sound can resume at the audio device via operation of the audio device driver 214. No other audio application will crash because the audio application 202 is isolated by the environment 200 from that of other audio applications.

A crash in the processing of the LFX APO by the processing context 270 will disassociate the input buffer 208 from the audio application 202. Any audio data stream remaining after the crash in the processing of the processing context 270 will need to be cleaned up. When the crash occurs, the service context 272 can be notified of the crash. When so notified, the service context 272 can close down the audio data streams remaining after the crash. In order to clean up the remaining audio data streams, the service context 272 can maintain a list created for the processing of audio data by the process context 270. This list can be used by the service context 272 to leave a thread that waits for the exit of the process context 270 (or for that of any other such process context) that has a remaining audio data stream.

If processing by the process context 270 crashes, the service context 272 will stop and close all audio data streams that had been opened from the processing by the process context 270. If the audio application 202 crashes, neither the audio device driven by audio device driver 214 nor the global audio engine 274 will be affected. Rather, audio data can still be streamed by other applications to either the audio device driven by audio device driver 214 or to the global audio engine 274. Due to the crash in process context 270, however, the input buffer 208 will be disassociated from the process context 270. As such, audio data in the input buffer 208 can not be used. When the service context 272 detects that the processing by the process context 272 has crashed, then each connection to the input buffer 208 is closed or de-allocated. In one implementation, the audio application 202 is not automatically recovered. Rather, the audio application 202 can be restarted by a user, if so desired.

Figure 4:
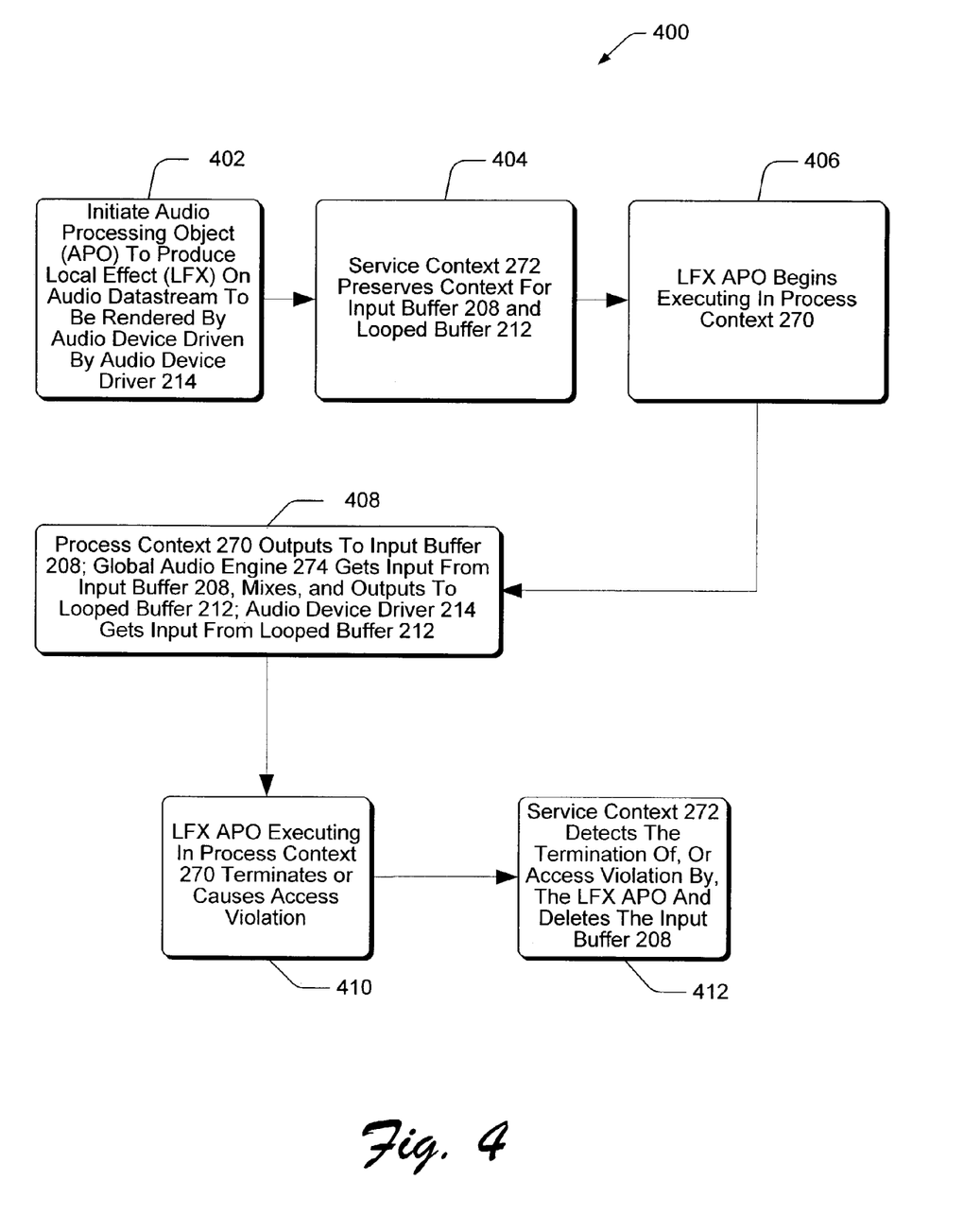
FIG. 4 shows a flow chart illustrative of a process in which an audio subsystem of an operating system services a request for executing an audio processing object (APO) to produce a local audio effect (LFX) on an audio datastream to be rendered by an audio device driven by an audio driver, where various context of the audio subsystem are restored after an access violation by the LFX APO using previously preserved contexts.

FIG. 4 shows a process 400 for recovering from an access violation by a Local Effects (LFX) Audio Processing Object (APO) executing in the process context 270. In reference to FIGS. 2 and 4, process 400 begins at block 402 where the APO for producing the LFX on an audio datastream is initiated. The audio datastream is to be rendered by an audio device driven by the audio device driver 214. At block 404, the service context 272 preserves the context (e.g., address and data structures) of the input buffer 208 and the looped buffer 212. At block 406, the LFX APO begins executing in the process context 270. At block 408, the process context 270 outputs to the input buffer 208 and the global audio engine 274 gets input from the input buffer 208. The global audio engine 274 mixes audio datastreams from the input buffer 208 and outputs a mixed audio datastream to the looped buffer 212. At block 410, the LFX APO terminates or causes an access violation. At block 412, the service context 272 detects the termination or access violation and deletes the input buffer 208.

Various operating systems for respective computing systems can benefit from the foregoing implementations, particularly where the operating system provides audio services for some combination of the capture and the render of audio data, and where the operating system is multi-threaded and multi-tasking. Exemplary contemporary operating systems include Mac OS (Version 10 and below) provided by Apple Computer, Inc., Cupertino of California, USA, BeOS developed by Be, Inc. of Mountain View, Calif., Windows® OS provided by Microsoft Corporation of Redmond, Wash., USA, and the freeware Linux® OS. Moreover, benefits from this patent disclosure can be realized by any multi-threaded operating system that allows untrusted media applications to execute third party programs that can perform access violations or otherwise stop the operating system from operating correctly. For example, the operating system contemplated herein provides an extensible media processing system for untrusted third party media applications for audio processing effects that can be used in a global context to alter audio signals. Poorly written or malicious code can be run without crashing a part of the audio system of the operating system that is servicing a particular audio device. Crash avoidance is accomplished in various implementations by partitioning the audio subsystem into logically separated partitions using protection mechanisms in the operating system, such as a process. The process minimizes the impact to the operating system of the poorly written code. Address space and data structures associated with the process are used by the operating system for the process to run. As such, the operating system runs the process in an isolated processing context as a form of memory protection and as a form of context protection which can be represented as a process (or a thread).

Exemplary Computing System and Environment

Figure 5:
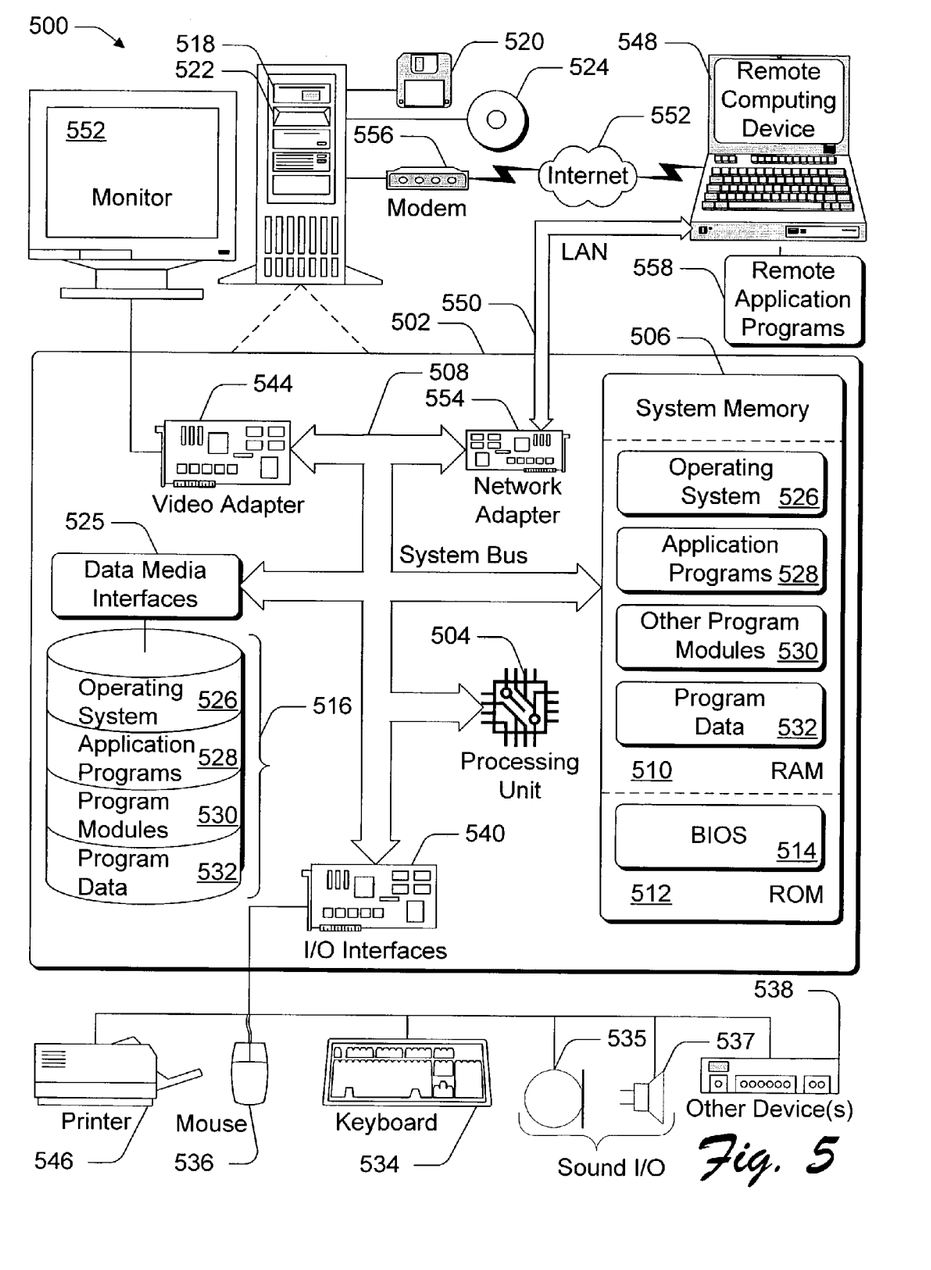
FIG. 5 illustrates an example of a computing environment within which the computing system, software applications, methods and systems described herein can be either fully or partially implemented.

FIG. 5 illustrates an example of a computing environment 500 within which the applications, including the Real Time Communication Application (RTC) and the media player application (MP), described herein can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The applications (including the RTC and the MP) may be described in the general context of computer-executable instructions, such as program modules, being executed by a computer. Generally, program modules include routines, programs, objects, components, data structures, etc. that perform particular tasks or implement particular abstract data types. The applications (including the RTC and the MP) may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing system in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 502 typically includes a variety of computer readable media. Such media can be any available media that is accessible by computer 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of the RTC and/or MP disclosed herein. Operating system 526 can include audio capture and render services such that a media application can get a global audio output system-wide mix for signal processing.

Computer system 502 can include a variety of computer readable media identified as communication media. Communication media typically embodies computer readable instructions, data structures, program modules, or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 502 via input devices such as a keyboard 534 and a pointing device 536 (e.g., a "mouse"). A microphone 535 can be used to input vocal command that can be subject to a voice recognition process for passing on the vocal input. Other input devices 538 (not shown) can include a joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. Input/output interfaces 540 can include a sound card, an integrated (e.g., on-board) sound card, etc. One or more speakers 537 can be in communication with input/output interfaces 540. In addition to the monitor 542, other output peripheral devices can include components such as a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
   receiving a request for an operating system to execute an audio processing object (APO) for a global audio effect (GFX) to be performed upon an audio data stream to be output at an audio device driven by an audio device driver, wherein the operating system includes an audio subsystem having an input buffer, a looped buffer, and logically separate contexts that include a service context, and a global audio engine;
   preserving, in the service context, the context for the input buffer, the global audio engine, and the looped buffer;
   operating the global audio engine to perform digital signal processing with the APO on an audio data stream in the input buffer to form a digital signal processing (DSP) audio data stream in the looped buffer;
   inputting the DSP audio data stream in the looped buffer to the audio device driver driving the audio device; and
   upon a termination of, or an access violation by, the APO:
      restoring each of the input buffer, the global audio engine, and the looped buffer with the context respectively preserved for each in the service context; and
      optionally resuming the execution of the APO in the global audio engine.

2. The method as defined in claim 1, wherein the termination of, or an access violation by, the APO is detected by the service context.

3. The method as defined in claim 1, wherein:
   the context of the input buffer comprises an address and a data structure associated with the input buffer;
   the context of the global audio engine comprises an address and a data structure associated with the global audio engine; and
   the context of the looped buffer comprises an address and a data structure associated with the looped buffer.

4. The method as defined in claim 1, wherein upon an access violation by the APO, the method further comprises:
   incrementing a counter representative of a number of the access violations by the APO; and
   when the counter exceeds a predetermined limit, outputting a diagnostic and prohibiting the resuming of the execution of the APO in the global audio engine.

5. The method as defined in claim 1, wherein:
   the operating system further comprises a plurality of said looped buffers for a corresponding plurality of said global audio engines; and
   each said global audio engine outputs one said DSP audio data stream to the corresponding said looped buffer to provide input to a corresponding said audio device driver for driving a corresponding said audio device.

6. The method as defined in claim 5, wherein:
   the operating system further comprises a plurality of said input buffers each containing an audio data steam to be rendered by a corresponding said audio device; and
   each said global audio engine corresponds to one said input buffer.

7. The method as defined in claim 6, wherein each said input buffer receives the corresponding said audio datastream from an audio application requesting audio services from the operating system for at least one said audio device.

8. The method as defined in claim 1, further comprising rendering the DSP audio data stream with the audio device driven by the audio device driver.

9. The method as defined in claim 1, wherein the operating system is in a memory having a plurality of separate partitions including:
   a partition for a kernel; and
   a partition for the audio subsystem that has separated subpartitions comprising:
      a subpartition for the service context; and
      a subpartition for the global audio engine.

10. The method as defined in claim 9, wherein the plurality of separate partitions further comprises a partition for a processing context having a local engine for executing an APO to output the audio datastream to the input buffer.

11. The method as defined in claim 10, wherein:
    the audio datastream in the input buffer comprises audio data from a plurality of audio applications each of which are to be rendered with the audio device; and
    the global audio engine mixes the audio data from the plurality of audio applications to form the DSP audio data stream in the looped buffer.

12. The method as defined in claim 1, wherein the GFX is selected from the group consisting of a reverberation effect, an audio distortion effect, a speaker compensation effect, a multiband audio equalizer effect.

13. One or more computer-readable media having computer-readable instructions thereon which, when executed by the computing system, implement the method of claim 1.

14. A method comprising:
    receiving a request from an audio application for an operating system to execute an audio processing object (APO) for a global audio effect (GFX) to be performed upon an audio data stream to be output at an audio device driven by an audio device driver, wherein:
       the operating system has separate partitions in a memory including:
          a kernel; and
          an audio subsystem having an input buffer and a looped buffer;
       the partition of the audio subsystem in the memory has separate subpartitions including:
          a service context; and
          a global audio engine for executing the APO;
    preserving addresses and data structures associated with the input buffer, the looped buffer, and the global audio engine in the service context;
    operating the global audio engine to:

perform digital signal processing with the APO on an audio data stream in the input buffer to form a digital signal processing (DSP) audio data stream; and output the DSP audio data stream to the looped buffer;

inputting the DSP audio data stream in the looped buffer to the audio device driver driving the audio device for rendering the DSP audio data stream; and upon a termination of or an access violation by the APO:

restoring the input buffer with the preserved addresses and data structures for the input buffer in the service context;

restoring the global audio engine with the preserved addresses and data structures for the global audio engine in the service context;

restoring the looped buffer with the preserved addresses and data structures for the looped buffer in the service context; and optionally resuming the execution of the APO in the global audio engine.

15. The method as defined in claim 14, wherein the termination of, or an access violation by, the APO is detected by the service context.

16. The method as defined in claim 14, wherein the partition of the audio subsystem in the memory further comprises a separate subpartition for a processing context having a local engine for executing an APO to output the audio datastream to the input buffer.

17. The method as defined in claim 16, wherein:
the audio datastream in the input buffer comprises audio data from a plurality of audio applications each of which are to be rendered with the audio device; and
the global audio engine mixes the audio data from the plurality of audio applications to form the DSP audio data stream in the looped buffer.

18. The method as defined in claim 14, wherein:
the input buffer is logically situated in the partition of the audio subsystem in the memory shared between the partition of the process context and the partition of the global audio engine; and
the looped buffer is logically situated in the partition of the audio subsystem in the memory shared between the partition of the global audio engine and the partition of the kernel.

19. The method as defined in claim 14, wherein upon an access violation by the APO, the method further comprises:
incrementing a counter representative of a number of the access violations by the APO; and
when the counter exceeds a predetermined limit, outputting a diagnostic and prohibiting the resuming of the execution of the APO in the global audio engine.

20. The method as defined in claim 14, wherein:
the operating system further comprises a plurality of said looped buffers for a corresponding plurality of said global audio engines; and
each said global audio engine outputs one said DSP audio data stream to the corresponding said looped buffer to provide input to a corresponding said audio device driver for driving a corresponding said audio device.

21. The method as defined in claim 20, wherein:
the operating system further comprises a plurality of said input buffers each containing an audio data steam to be rendered by a corresponding said audio device; and
each said global audio engine corresponds to one said input buffer.

22. The method as defined in claim 21, wherein each said input buffer receives the corresponding said audio datastream from a corresponding said audio application requesting audio services from the operating system for at least one said audio device.

23. One or more computer-readable media having computer-readable instructions thereon which, when executed by the computing system, implement the method of claim 14.

24. A computer executable operating system comprising a kernel and an audio subsystem in logically separate partitions, wherein the audio subsystem has an input buffer and a looped buffer in communication with a device driver for driving an audio device, the audio subsystem also having a plurality of logically separate subpartitions that include:

a global audio engine to execute an audio processing object (APO) for a global audio effect (GFX) to be performed upon an audio data stream in the input buffer to form an audio datastream in the looped buffer to be rendered by the audio device driven by the device driver; and a service context for preserving the context of the input buffer, the global audio engine, and the looped buffer, wherein upon a termination of or an access violation by the APO executing in the global audio engine:

each of the input buffer, the global audio engine, and the looped buffer is restored using the context respectively preserved for each in the service context; and the execution of the APO in the global audio engine optionally resumes.

25. The computer executable operating system as defined in claim 24, wherein:
the context of the input buffer comprises an address and a data structure associated with the input buffer;
the context of the global audio engine comprises an address and a data structure associated with the global audio engine; and
the context of the looped buffer comprises an address and a data structure associated with the looped buffer.

26. The computer executable operating system as defined in claim 24, wherein upon an access violation by the APO:
a counter representative of a number of the access violations by the APO is incremented; and
when the counter exceeds a predetermined limit, a diagnostic is output and the APO is prohibited from execution in the global audio engine.

27. The computer executable operating system as defined in claim 24, wherein:
the operating system further comprises a plurality of said looped buffers for a corresponding plurality of said global audio engines; and
each said global audio engine outputs one said audio datastream to the corresponding said looped buffer to provide input to a corresponding said audio device driver for driving a corresponding said audio device.

28. The computer executable operating system as defined in claim 27, wherein the operating system further comprises a plurality of said input buffers each containing an audio data steam to be rendered by a corresponding said audio device; and
each said global audio engine corresponds to one said input buffer.

29. The computer executable operating system as defined in claim 28, wherein each said input buffer receives the corresponding said audio datastream from an audio application requesting audio services from the operating system for at least one said audio device.

30. The computer executable operating system as defined in claim 24, wherein the plurality of logically separate partitions further comprises a partition for a processing context having a local engine for executing an APO to output an audio datastream to the input buffer.

31. The computer executable operating system as defined in claim 24, wherein:
the input buffer stores audio data from a plurality of audio applications each of which are to be rendered with the audio device; and
the global audio engine mixes the audio data from the plurality of audio applications to form audio data in the looped buffer.

32. An apparatus comprising:
means for storing a plurality of logically separate partitions that include:
a kernel for an operating system; and
an audio subsystem for the operating system, the audio subsystem including:
an input buffer and a looped buffer in communication with a means for driving a means for rendering audio; and
a plurality of logically separate subpartitions that include:
a service context; and
a global audio engine;
means, when executing the audio subsystem, for:
preserving the context of the input buffer, the global audio engine, and the looped buffer in the service context; and
executing an audio processing object (APO) to produce a global audio effect (GFX) upon an audio datastream in the input buffer to form an audio datastream in the looped buffer to be rendered by means for rendering audio driven by the means for driving the audio device;
means, upon an access violation by the APO executing in the global audio engine, for:
restoring each of the input buffer, the global audio engine, and the looped buffer using the context respectively preserved for each in the service context; and
resuming the execution of the APO in the global audio engine.

33. The apparatus as defined in claim 32, wherein:
the context of the input buffer comprises an address and a data structure associated with the input buffer;
the context of the global audio engine comprises an address and a data structure associated with the global audio engine; and
the context of the looped buffer comprises an address and a data structure associated with the looped buffer.

34. The apparatus as defined in claim 32, wherein upon an access violation by the APO, the means for resuming:
increments a counter representative of a number of the access violations by the APO; and
when the counter exceeds a predetermined limit, outputs a diagnostic and prohibits the resuming of the execution of the APO in the global audio engine.

35. The apparatus as defined in claim 32, wherein:
the audio subsystem further comprises a plurality of said looped buffers for a corresponding plurality of said global audio engines; and
each said global audio engine outputs one said audio data stream to the corresponding said looped buffer to provide input to a corresponding said means for driving a corresponding said means for rendering audio.

36. The apparatus as defined in claim 35, wherein the audio subsystem further comprises a plurality of said input buffers each containing an audio data steam to be rendered by a corresponding said means for rendering audio; and
each said global audio engine corresponds to one said input buffer.

37. The apparatus as defined in claim 36, wherein each said input buffer receives the corresponding said audio datastream from an audio application requesting audio services from the operating system for at least one said means for rendering audio.

38. The apparatus as defined in claim 32, wherein the plurality of logically separate subpartitions of the audio subsystem further comprises a subpartition for a processing context having a local engine for executing an APO to output the audio datastream to the input buffer.

39. The apparatus as defined in claim 38, wherein:
the audio datastream in the input buffer comprises audio data from a plurality of audio applications each of which are to be rendered with the means for rendering audio; and
the global audio engine mixes the audio data from the plurality of audio applications to form the audio data stream in the looped buffer.

40. A computing system comprising a processor for executing an audio application to generate a first audio datastream and for executing an operating system that is logically separated into a partition for a kernel and a partition for an audio subsystem having logically separate subpartitions, wherein a process for processing the first audio datastream with the audio subsystem has a context that is preserved in a first said subpartition prior to executing the process in a second said subpartition such that when the process commits an access violation, the process is recovered by restoring the context thereof from the first said subpartition.

41. The computing system as defined in claim 40, wherein the preserved context for the process comprises address and data structure information sufficient to recover the process by the restoration of the preserved context in the audio subsystem.

42. The computing system as defined in claim 40, wherein:
the processor executes a second audio application to generate a second audio datastream to be output to a second audio device different than a first audio device at which the first audio data steam is to output; and
the access violation and the recovery of the process effects:
neither the execution of the second audio application;
nor the second audio datastream to be output to the second audio device.

43. A computing system comprising:
a processor for executing an operating system and a plurality of audio applications;
a plurality of multimedia reading devices for interoperating with the plurality of audio applications to respectively produce audio data for communication to the operating system;
a plurality of audio devices driven by respective audio device drivers for rendering the audio data communicated to the operating system;
storage for the plurality of audio applications and the operating system, wherein the operating system has a plurality of logically separate partitions that include a kernel and an audio subsystem, wherein the audio subsystem has:
  a plurality of logically separate subpartitions that include:
    a process context,
    a service context; and
    a global audio engine;
  an input buffer in communication with the process context and the global audio engine; and
  a looped buffer in communication with one of the audio device drivers for driving one of the audio devices;
wherein the processor executes the operating system and one of the audio applications so as to:
  preserve the context of the input buffer, the global audio engine, and the looped buffer in the service context;
  generate audio data from the one said audio application for input to the process context for output as an audio datastream in the input buffer;
  execute an audio processing object (APO) to produce a global audio effect (GFX) upon the audio datastream in the input buffer to form an audio datastream in the looped buffer to be rendered by one of the audio devices driven by one of the audio device drivers; and
  upon an access violation by the APO executing in the global audio engine:
    restore each of the input buffer, the global audio engine, and the looped buffer using the context respectively preserved for each in the service context; and
    resume the execution of the APO in the global audio engine.

44. A computer readable storage medium containing computer-executable instructions that include code segments executable by a processor of the computer, comprising;

a first code segment for processing a request from an audio application to generate a first audio datastream by executing an operating system that is logically separated into a partition for a kernel and a partition for an audio subsystem having logically separate subpartitions;
  a second code segment for preserving in a first said subpartition the context of a process for processing the first audio datastream; and
  a third code segment for processing in a second said subpartition the first audio datastream with the process, wherein when the process commits an access violation the process is recovered by restoring in the audio subsystem the preserved context from the first said subpartition.

45. The computer readable storage medium as defined in claim 44, wherein the preserved context for the process comprises address and data structure information sufficient to recover the process by the restoration of the preserved context in the audio subsystem.

46. The computer readable storage medium as defined in claim 44, further comprising a fourth code segment for processing a request from an audio application to generate a second audio datastream by executing the operating system, wherein the second audio datastream is directed to be output to a second audio device different than a first audio device at which the first audio data steam is to be output, wherein the access violation and the recovery of the process effects:
  neither the generation of the second audio datastream by an execution of the second audio application;
  nor the second audio datastream to be output to the second audio device.

* * * * *